Oct. 16, 1945.  H. G. DALEY ET AL  2,386,770
PURIFICATION OF BUTADIENE
Filed March 2, 1943
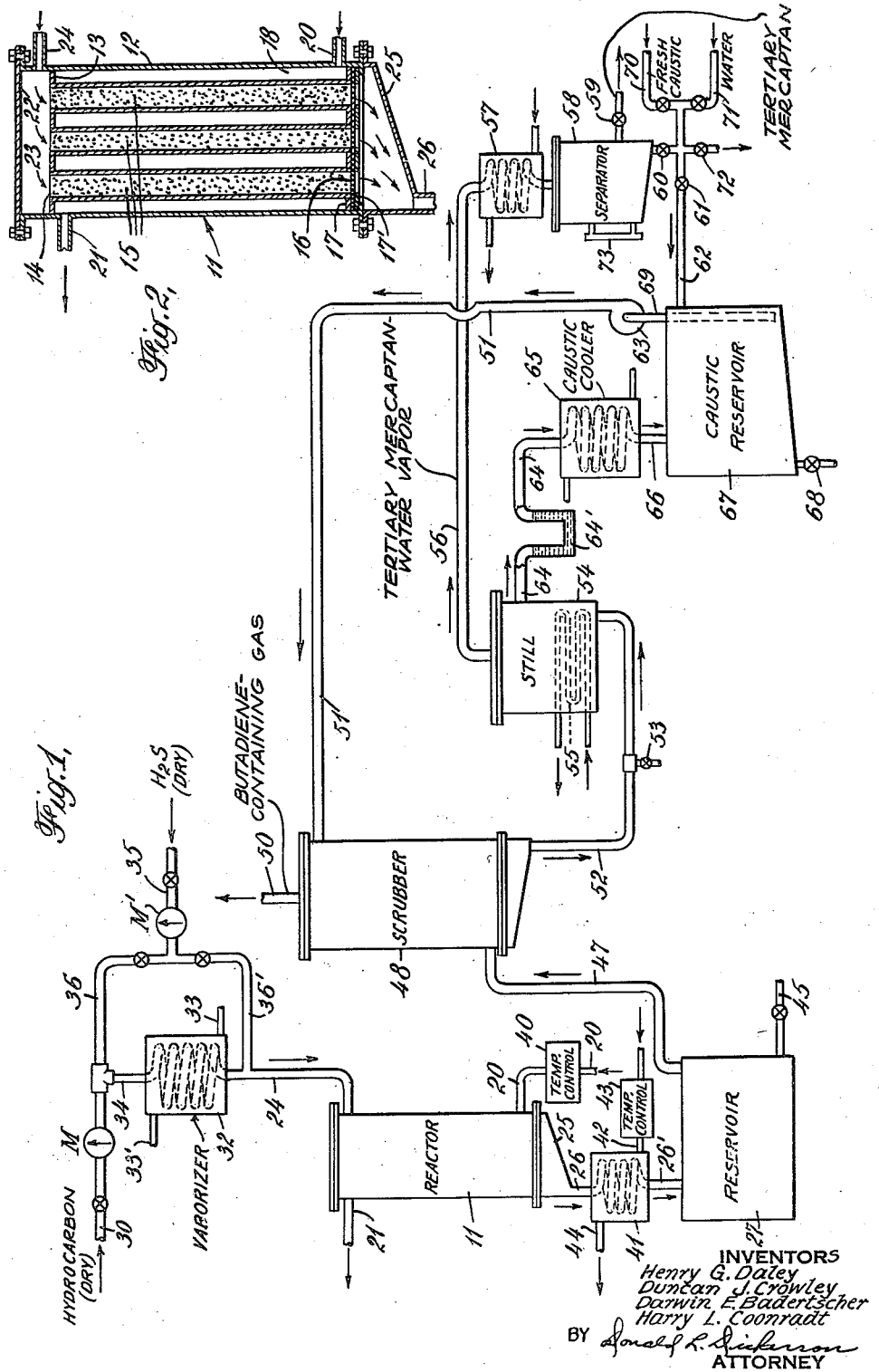
INVENTORS
Henry G. Daley
Duncan J. Crowley
Darwin E. Badertscher
Harry L. Coonradt
BY Donald R. Dickerson
ATTORNEY Patented Oct. 16, 1945

2,386,770

UNITED STATES PATENT OFFICE 2,386,770

PURIFICATION OF BUTADIENE

Henry G. Daley, Woodbury Heights, Duncan J. Crowley, Penns Grove, and Darwin E. Badertscher, Woodbury, N. J., and Harry L. Coonradt, Camp Lee, Va., assignors to Socony-Vacuum Oil Company, Incorporated, a corporation of New York Application March 2, 1943, Serial No. 477,714

10 Claims. (Cl. 260—681.5)

This invention has to do with a selective catalytic method for effecting the separation of butadiene from certain olefins hereinafter defined as "tertiary base olefins." More specifically, the present invention has to do with the purification of butadiene by means of a vapor phase, catalytic treatment of a hydrocarbon mixture containing butadiene and "tertiary base olefins," with $H_2S$ whereby butadiene is purified through the conversion of said "tertiary base olefins" to their corresponding mercaptans and removal of said mercaptans therefrom.

"Tertiary base olefins" as defined herein are those olefins characterized by the presence of a tertiary olefin linkage

where R is a low molecular weight alkyl group, such as methyl. Typical members of this class are isobutylene, $(H_3C)_2C=CH_2$, and trimethyl ethylene

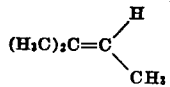

It will be apparent to those familiar with the art that butadiene

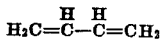

does not come within the foregoing definition.

The problem of the separation of butadiene from related hydrocarbons has arisen out of the present demand for relatively pure butadiene for the production of synthetic elastomers and related materials. Several methods are now in use for the production of butadiene, but most, if not all, are characterized by the production of by-products difficultly separable from butadiene. The most generally accepted physical methods now employed for separating butadiene from such contaminants include solvent extraction, adsorption and fractional distillation; however, the recoveries of pure butadiene by such methods are generally poor. Various chemical methods, such as acid polymerization, which have been suggested also tend to give relatively poor recoveries of pure butadiene. In short, the present methods, physical and chemical alike, have only partially solved the separation problem.

This invention is directed to this problem, and has for its object the provision of a chemical method, involving a reaction into which butadiene does not enter, for the separation of butadiene from tertiary base olefins present in hydrocarbon mixtures. Another object of this invention is the provision of such a method whereby high recoveries of relatively pure butadiene from the aforesaid mixtures are realized. Other objects of the present invention will be apparent to those skilled in the art from the description and illustrative examples provided hereinafter.

The present invention is an outgrowth of the broad discovery that the C—4 and C—5 tertiary base olefins, isobutylene, trimethyl ethylene and unsymmetrical methyl ethyl ethylene (of which the latter two are tertiary base amylenes), contained in a mixture of hydrocarbons are converted to their corresponding tertiary mercaptans when the hydrocarbon mixture in the vapor phase and in admixture with $H_2S$ is passed over a suitable catalyst with the temperature of the catalyst or reaction zone maintained within certain preferred limits, depending upon the nature of the catalyst, the pressure in the reaction zone, etc. This broad discovery forms the subject matter of a copending application Serial No. 461,116, filed October 7, 1942, by three of the present, joint inventors; D. E. Badertscher, H. L. Coonradt and D. J. Crowley; and the present application is thus a continuation-in-part of the aforesaid application. Specifically, the present invention is predicated upon the discovery that butadiene present in a hydrocarbon mixture containing a tertiary base olefin, or tertiary base olefin, is unaffected and that said tertiary base olefin is affected when said hydrocarbon mixture is subjected to the aforesaid treatment with $H_2S$, thereby providing a means for the separation of butadiene from said hydrocarbon mixture. The tertiary base olefin, or olefins, present in said hydrocarbon mixture are converted by such treatment with H₂S to their corresponding tertiary mercaptans.

Our invention contemplates the use of a catalyst which will promote the conversion of the tertiary base olefin with hydrogen sulfide to the corresponding tertiary mercaptan. Typical catalysts which we have found to be effective for the purposes of this invention are the following: acids and thioacids of phosphorus and their anhyrides and thioanhydrides, elementary (red) phosphorus, sulfuric acid and sulfonic acids, nonplastic clay-type catalysts typified by fuller's earth, alumina-silica type synthetic catalysts and halogenated acids, such as trichloracetic, etc. Particularly preferred herein is phosphoric acid. There is little, if any, diminution in the effectiveness of these catalysts as used herein. Naturally, the presence of appreciable amounts of moisture in the reactants would tend to leach out water-soluble catalysts such as phosphoric acid. Therefore, it is desirable to dry the gases prior to contacting them with the catalyst. The drying of the gases prior to introduction into the reactor presents no difficulties and is routine procedure to those familiar with the chemical and petroleum arts. Depending upon the physical properties of the catalyst, the catalyst may be used alone or adsorbed on the surface of a suitable solid carrier, the latter form being preferred.

As pointed out in the aforesaid copending application, we have discovered also that the reaction of hydrogen sulfide with a tertiary base olefin to form a tertiary mercaptan by the process contemplated therein and adapted herein for the purification of butadiene, is quite sensitive to temperature as a means for controlling the conversion of tertiary base olefins to the corresponding tertiary mercaptans. Therefore, it is a further important object of this invention to provide a method of the class described wherein the temperature is controlled to afford a maximum conversion of the tertiary base olefins to said mercaptans thereby effecting a maximum removal of said olefins for the purification of butadiene.

Further details in a preferred procedure for carrying out the method contemplated by this invention may be obtained from the following description taken with accompanying drawing, which are chosen for illustrative purposes only and in which Figure 1 is a diagrammatic view illustrating one form of apparatus which may be employed in practicing the method of this invention; and Figure 2 is a sectional elevation showing in enlarged detail a typical form of reactor which may be employed in the system shown in Figure 1.

In Figure 1, reference numeral 11 indicates a reactor which is shown in Figure 2 as embodying a shell 12 which may be of circular or other suitable cross-sectional shape, such shell being provided near its top with a partition plate 13 having a plurality of openings 14, which receive the upper ends of tubes 15 secured therein in any suitable manner, such as welding (not shown). The lower ends of the tubes 15 are supported in openings 16 through a bottom partition plate 17 secured near the bottom of the shell 12 in any suitable manner so as to form a chamber 18 in the shell between plates 17 and 13. For the purpose of controlling the temperature within the tubes 15, a suitable heat exchange medium is circulated through the chamber 18 from an inlet 20 to an outlet 21.

The top of the chamber or shell 12 is provided with a cover 22, which, with the top partition plate 13, forms a chamber 23 in the top of the shell adapted to receive reaction vapors through an inlet 24, which vapors enter the various tubes from the chamber 23, as indicated by the arrows. The bottom of the shell 12 is provided with a bottom cover 25, through which the products of reaction pass from the tubes 15 into the product outlet 26.

The bottoms of the various tubes 15 are provided with a suitable mesh material to support a body of catalyst indicated by the stippling in Figure 2 within these tubes. This mesh material may be supported in any suitable manner and, as shown in Figure 2, comprises a screen supported beneath the bottom plate 17 by a similarly perforated plate 17'.

As aforesaid, the reaction contemplated herein is quite sensitive to temperature control; and, although the length and size of the reaction tubes 15 and the relation between the total volume of the chamber 18 and the volume within such chamber which is occupied by the reaction tubes may be varied over relatively wide limits, it is to be understood that the relationship between these various factors, the temperature of the heat exchange medium, and the rate at which heat exchange medium is circulated through the chamber 18 should be so adjusted as to maintain the temperature in the reaction zones of the various catalyst tubes 15 within the range for most efficient operation, as will be hereinafter discussed.

Referring back to Figure 1, reference numeral 30 indicates a conduit adapted to carry hydrocarbons through a meter M into the reactor inlet conduit 24. This conduit is shown as passing through a pre-heater or vaporizer 32 through which a hot heat exchange medium is circulated by means of connections 33 and 33'. Hydrogen sulfide is introduced into the system through the valved connection 35 and a meter M', such hydrogen sulfide being optionally introduced into the inlet 24 on either side of the vaporizer 32 by means of valved connection 36 or 36'.

With regard to the vaporizer or pre-heater 32, it is to be understood that other suitable means may be provided for insuring that the reactants are in the vapor phase when they pass into the catalyst tubes in the reactor. For example, it may be found, particularly after the reaction has been started, that there is sufficient heat in the reactor itself to effect this vaporization, or heater coils may be provided in the chamber 23, as will readily appear to those skilled in the art.

Suitable means for controlling the temperature of the heat exchange medium entering the reactor through inlet 20 are indicated by reference numeral 40. The temperature-control means 40 may be any suitable heat exchange device and can be either manually or automatically operated in any manner well known to those skilled in the art. Also, if desired, the heat exchange medium may be recirculated from the outlet 21 through the temperature control 40 to the inlet 20 as will be obvious to those skilled in the art. Any suitable heat exchange medium, such as water, may be employed to control the temperature in the chamber 18 of reactor 11.

Reference numeral 41 indicates a cooler or condenser through which the product-outlet conduit 26 passes into conduit section 26', which opens into a sealed receiving chamber 27. The cooler or condenser 41 is provided with an inlet 42 equipped with temperature-controlling means 43 and with a heat exchange medium-outlet connection 44. The temperature of the cooler 41 may be controlled through the control 43 so as to condense substantially all of the mercaptan which can then be withdrawn together with the polymerization products of reaction from the sealed chamber 27 through a valved liquid-outlet connection 45, or such temperature in the cooler 41 may be controlled so that only the high boiling products are condensed, substantially all of the mercaptan together with the hydrogen sulfide and hydrocarbon gases, of which butadiene is one, being conducted in such case from the sealed chamber 27 through a vapor-outlet conduit 47 to the bottom of a scrubbing tower 48.

The top of the scrubbing tower 48 is provided with a gas vent 50 and an inlet conduit 51 for a scrubbing solution such as aqueous caustic soda. The bottom of the scrubber 48 has an outlet 52 which connects with the bottom of a still or stripper 54. Outlet connection 52 is equipped with a drainage valve 53. The still or stripper 54 is shown as being equipped with a high-pressure steam coil or other suitable source of heat 55, and has an outlet 56 which connects through a condenser 57, with a separator 58. The separator 58 is provided with a valved mercaptan outlet 59, a gauge glass 73, to facilitate removal of the mercaptan, and a valved water outlet 60. The water outlet 60 connects through a valve 61 with a water return pipe 62, which in turn is shown as connecting with the caustic reservoir 67. The still 54 is shown as being equipped with a caustic outlet conduit 64 which includes a liquid caustic well 64', the purpose of which is to prevent mercaptan vapor from leaving still 54 by the conduit 64. Caustic passes through conduit 64 to a caustic cooler 65 and exits therefrom through outlet 66 to the caustic reservoir 67. The caustic reservoir is fitted with a drainage means 68. The caustic reservoir is also equipped with a conduit 69 which connects with the intake side of a pump 63. The discharge side of pump 63 is shown as connecting with inlet conduit 51 of scrubber 48. Means indicated at 70 are provided for adding fresh caustic when desired; and means indicated at 71 are provided for adding fresh water to the system. A water drain is shown at 72, and the last-described connections are shown as being provided with suitable valves for controlling the addition or discharge of the various media.

In practicing the method contemplated herein with an apparatus of the type shown in Figures 1 and 2, the hydrocarbon mixture predominantly comprised of butadiene and tertiary base olefins, and the hydrogen sulfide are metered into the system through meters M and M'. The proportions of hydrogen sulfide and said hydrocarbon mixture may be varied over relatively wide limits, but for optimum results, it is preferred that these proportions be such that the hydrogen sulfide be slightly in excess of the molar equivalent required to react with the tertiary base olefin, or tertiary base olefins, present in said hydrocarbon mixture.

The admixture of hydrocarbon and H2S is introduced into the reactor 11 in the vapor phase, as by passing the hydrocarbon through the vaporizer 32 prior to admixture with H2S. Upon entering the reactor 11, the hydrocarbon —H2S vapor mixture passes through the catalyst tubes 15 where it contacts the catalyst for a short period of time. It is a feature of the method contemplated herein that the period of catalyst contact is very short. With a catalyst of the type described hereinabove, contact times of from about a fraction of a second to about several minutes serve the purposes of this invention, but, in general, a contact time of a few seconds is preferred. The temperature of the heat transfer medium in chamber 18 is controlled by the temperature control 40 so that the temperature of the catalyst zone within the tubes 15 is maintained within the range that will give the desired conversion. As aforesaid, the method contemplated herein is quite sensitive to temperature. It is important that the temperature of the reaction be maintained below the temperature at which butadiene commences to react with H2S, which is in the neighborhood of 400° C., and we have found that the method is particularly effective between the limits of atmospheric temperature (about 20° C.) and about 175° C. For optimum conversion of the tertiary base olefins present in the butadiene-hydrocarbon mixture, and consequent maximum purification of the butadiene, a more closely defined range of temperature is necessary. As pointed out in the copending application identified above, the method is particularly efficient, when phosphoric acid is used as the catalyst, with a temperature range of from about 60° C. to about 90° C., the maximum efficiency being attained with a temperature of about 70° C. to 80° C.

When in contact with the catalyst in the catalyst tubes 15 under the conditions described herein, the tertiary base olefin (or olefins) of the butadiene-hydrocarbon mixture reacts with the hydrogen sulfide in the reaction mixture to form the corresponding tertiary mercaptan (or mercaptans). For example, the isobutylene present in the butadiene-hydrocarbon mixture is converted to tertiary butyl mercaptan and a small amount of said isobutylene is converted to higher boiling materials which are mainly polymers of isobutylene and high boiling alkyl sulfur compounds. Thus, the effluent gases leaving the reactor 11 through discharge conduit 26 contain tertiary mercaptans typical of which is tertiary butyl mercaptans, high boiling materials, traces of unreacted tertiary base olefins, traces of unreacted H2S and butadiene as well as other hydrocarbons such as secondary olefins, normal olefins and saturated hydrocarbons present in the butadiene-hydrocarbon mixture. That is, only the tertiary base olefins present in said hydrocarbon mixture are effected by contact with the catalyst and H2S. The effluent gases flow through the discharge conduit 26 to the condenser 41. As aforesaid, the temperature of the condenser may be maintained such that only the high boiling products are condensed, in which case, the condensate flows into the sealed chamber 27 and from which it can then be withdrawn through the outlet connection 45. The unreacted hydrocarbons of which butadiene is one, unreacted H2S and the tertiary mercaptans, such as tertiary butyl mercaptan, are not condensed when such a temperature is maintained in the condenser 41, and flow through the vapor-outlet conduit 47 to the bottom of the scrubbing tower 48. If desired, the temperature of the condenser 41 may be adjusted so that the greater portion of the tertiary mercaptans is condensed along with the high boiling materials. This condensate withdrawn through connection 45 may then be distilled in a suitable distillation tower (not shown) to separate the tertiary mercaptans from the polymerization products.

The uncondensed portion of the reaction mixture rises in the scrubber 48 and contacts a downstream of scrubbing solution, such as aqueous caustic soda whereupon tertiary mercaptans and hydrogen sulfide are converted respectively to the corresponding soluble alkali mercaptides and alkali sulfides or hydrosulfides. The unreacted hydrocarbons, such as butadiene, are unaffected by the caustic soda and are removed through the gas vent 50 from which they proceed to any further operations, such as, for example, drying, distillation, etc. (means not shown).

The alkali mercaptides and alkali sulfides or hydrosulfides in caustic solution pass out of the scrubber 48 through the outlet connection 52 to the still 54. High-pressure steam or other heating medium passes through the coil 55 in the still 54, thereby heating the caustic solution to an elevated temperature. On heating the caustic solution, the alkali mercaptides are converted to the corresponding tertiary mercaptans which, along with some water, distill from the solution. The tertiary mercaptan-water vapors rise to the outlet line 56, flow therethrough to the condenser 57 where they are condensed and from which the condensate flows to the separator 58. The condensate separates herein (58) into an upper layer of mercaptan, and a lower layer of water. The mercaptan layer is withdrawn through a valved outlet 59 to storage or other process, or processes, a gauge glass 73 being provided to facilitate the removal of mercaptan.

The lower water layer is allowed to drain from the bottom of the separator 58, through the water outlet 60. It is recombined, in passing through the valve 61 and the water-return pipe 62, with the caustic solution which has been discharged from the still 54. This caustic solution has passed through conduit 64, well 64', the cooler 65, conduit 66, to caustic reservoir 67. This cold caustic solution, which contains some alkali sulfide, combined with water from the separator 58 is pumped by means of the pump 63 to the caustic scrubber 48 through the outlet conduit 51. If, however, said caustic solution from the still 54 tends to accumulate an appreciable amount of alkali sulfide, it can be removed from the system by means of the drain 68, and can be replaced with a desired amount of fresh caustic through the means 70. This is necessary when an appreciable amount of unreacted $H_2S$ is present in the effluent gases (unreacted hydrocarbons of which butadiene is one such hydrocarbon) from the reactor 11 and which reacts with caustic soda in the scrubber 48 to form alkali sulfide. If it is necessary to introduce additional water into the system to add to the caustic solution cooled in the cooler 65, fresh water can be introduced through the means 71.

The selective action of $H_2S$ upon tertiary base olefins, such as isobutylene and isoamylenes, is influenced by a number of factors such as temperature, pressure, contact time and rate of flow of reactants, proportions of reactants, the catalyst used, etc. As we have previously indicated, temperature is the most important and most critical of these influencing factors. The reaction of the tertiary base olefin, such as isobutylene or isoamylenes, and hydrogen sulfide whereby the corresponding tertiary mercaptan is formed, is slightly exothermic. Therefore, in order that the temperature of the reaction mixture be controlled within the desired limits, the heat of reaction should be uniformly and readily withdrawn from the reaction zone. This may be accomplished by a proper control of the temperature and rate of flow of the heat transfer medium in the reactor.

It is one feature of this invention that high pressures are not required. On the contrary, atmospheric or, at most, pressures only slightly greater than atmospheric are used. In order that the reaction be carried out in the vapor phase, it is necessary that the pressure be less than that pressure at which liquefaction of the hydrocarbon would occur at the operating temperature. It will readily be seen that the use of pressures from about atmospheric to about 4 atmospheres are not such as to require the use of expensive high-pressure reaction chambers. This, of course, is a decided economic advantage.

As aforesaid, the proportions of reactants for our method obviously can be varied considerably. Theoretically, the optimum molar ratio of tertiary base olefins, present in the butadiene-hydrocarbon mixture, to hydrogen sulfide would be 1:1. In some cases, however, maximum conversions of tertiary base olefins to the corresponding tertiary mercaptans are obtained when a slight excess of $H_2S$ is used. Tertiary base olefins are notorious for their tendency to polymerize and this polymerization reaction tends to compete with the addition reaction with the resultant formation of high-boiling poly-tertiary base olefins. An increase of $H_2S$, therefore, will increase the conversion of said olefins to mercaptans by affording greater opportunity for the tertiary base olefin $-H_2S$ reaction. This factor of the molar ratio of the reactants naturally will be regulated by the economics of the particular case at hand, that is, by the relative costs of butadiene-hydrocarbon mixture and $H_2S$, and of their handling and recovery.

While it is possible, and it is contemplated herein, to use the catalyst without a catalyst support, it is preferred that the catalyst be supported on an adsorbent inert carrier. Many such substances may be used for this purpose, typical of which are wood charcoal, cocoanut charcoal, granulated coke, certain clays which are catalytically inactive for the purposes of this invention (as opposed to active non-plastic clays, silica gel, etc.). As indicated in the aforesaid copending application, wood and cocoanut charcoals exert little, if any, catalytic effect in the method of separation and purification contemplated herein.

To demonstrate the efficacy of the method of separation and purification of butadiene contemplated herein, several hydrocarbon mixtures containing isobutylene and butadiene were mixed with hydrogen sulfide and passed through a reactor containing phosphoric acid catalyst maintained at a temperature of 76° C. The reactor was a glass column approximately 30 inches long and 1.0 inch in diameter; it was packed with 300 cc. of phosphoric-acid impregnated wood charcoal weighing about 150 grams. The reaction products from the reactor were worked up substantially as described in the foregoing and the liquid material obtained from the caustic scrubbing solution followed by distillation, etc., which had a boiling range of 63° C. to 66° C. at atmospheric pressure, was reported as tertiary butyl mercaptan. The dried effluent gases from the scrubber were condensed and the refractive index of the liquid determined. The composition was estimated by referring to a refractive index-composition curve which had been prepared by plotting the refractive indices of known isobutylene-butadiene mixtures against the composition corresponding to each refractive index value.

The results of said separations and purifications are tabulated below in the table.

Table

| | Run No. | | | | | |
|---|---|---|---|---|---|---|
| | 1 | 2 | 3 | 4 | 1 5 | 6 |
| Reaction conditions: | | | | | | |
| Hydrogen sulfide, liters/hr. | 1.5 | 3.0 | 2.0 | 4.0 | 3.0 | 4.0 |
| Isobutylene, liters/hr | 1.5 | 3.0 | 2.0 | 4.0 | | 2.0 |
| Butadiene, liters/hr | 9.0 | 16.2 | 8.0 | 6.0 | 3.0 | 8.0 |
| Composition of hydrocarbons. | | | | | | |
| Butadiene, percent vol. | 85.7 | 84.3 | 80 | 60 | 100 | 80 |
| Isobutylene, percent vol. | 14.3 | 15.7 | 20 | 40 | 0 | 20 |
| Temperature, °C | 76 | 76 | 76 | 76 | 76 | 76 |
| Length of run, hrs | 5.5 | 5.5 | 6.5 | 5.5 | 3.75 | 5.0 |
| Catalyst | $H_3PO_4$ on cocoanut charcoal. | $H_3PO_4$ on wood charcoal. | $H_3PO_4$ on wood charcoal. | $H_3PO_4$ on wood charcoal. | $H_3PO_4$ on wood charcoal. | $H_3PO_4$ on wood charcoal. |
| Butadiene purity, percent vol. | 90 | 93 | 91 | 77 | | 89 |
| Yield tertiary butyl mercaptan. | | 53 | 64 | 42 | 0 | 70 |
| Butadiene recovery, percent vol. | | | 97 | 96 | | 90 |

[1] Run No. 5: Exploratory run to determine any possible reaction with pure butadiene.

It will be observed from the foregoing results that the method contemplated herein effectively brings about the recovery of butadiene from hydrocarbon mixtures comprised of butadiene and a typical tertiary base olefin, isobutylene. It will also be observed that a substantial amount of the isobutylene is removed from the isobutylene-butadiene mixture in one contact with the phosphoric acid catalyst and $H_2S$ at 76° C. For example, in run number 4, a 40:60 volume per cent mixture of isobutylene and butadiene was transformed into a mixture containing 77 volume per cent of butadiene, with a recovery of 96 volume per cent of the butadiene originally introduced. Similarly, isobutylene-butadiene mixtures containing 80 to 85.7 per cent butadiene by volume, in runs 1, 2, 3 and 6, illustrate the substantial increase in butadiene in the reaction product after just one pass through the catalyst chamber. It will be apparent to those skilled in the art that by means of several passes through the catalyst chamber, substantially pure butadiene will be obtained.

It is to be understood that this invention is not to be limited to the foregoing typical illustrative examples of the same, but is to be construed broadly as defined by the language of the appended claims.

We claim:

1. The method of purifying butadiene containing a tertiary base olefin as a contaminant, which comprises: passing an admixture of said contaminated butadiene and hydrogen sulfide in the vapor phase through a reaction zone containing a catalyst which promotes the conversion of said tertiary base olefin with hydrogen sulfide to the corresponding tertiary mercaptan, regulating the flow of said admixture through said reaction zone to provide therein a contact time from a fraction of a second to several minutes and maintaining the temperature of said admixture therein at a temperature below that at which butadiene will react with hydrogen sulfide, whereby said tertiary base olefin is converted to the corresponding tertiary mercaptan; and separating butadiene from the reaction mixture formed in the preceding operation.

2. The method of purifying butadiene containing a tertiary base olefin selected from the group consisting of isobutylene, trimethyl ethylene and unsymmetrical methyl ethyl ethylene as a contaminant, which comprises: forming an admixture of said contaminated butadiene and hydrogen sulfide; passing said admixture in the vapor phase through a reaction zone containing a catalyst which promotes the conversion of said tertiary base olefin with hydrogen sulfide to the corresponding tertiary mercaptan, regulating the flow of said admixture through said reaction zone to provide therein a contact time from a fraction of a second to several minutes and maintaining the temperature of said admixture therein at a temperature below that at which butadiene will react with hydrogen sulfide, whereby said tertiary base olefin is converted to the corresponding tertiary marcaptan; and separating butadiene from the reaction mixture formed in the preceding operation.

3. The method of purifying butadiene containing a tertiary base olefin selected from the group consisting of isobutylene, trimethyl ethylene and unsymmetrical methyl ethyl ethylene as a contaminant, which comprises: forming an admixture of said contaminated butadiene and hydrogen sulfide; passing said admixture in the vapor phase through a reaction zone containing a catalyst which promotes the conversion of said tertiary base olefin with hydrogen sulfide to the corresponding tertiary mercaptan, regulating the flow of said admixture through said reaction zone to provide therein a contact time from a fraction of a second to several minutes and maintaining the temperature of said admixture therein between about 25° C. and about 175° C., whereby said tertiary base olefin is converted to the corresponding tertiary mercaptan; and separating butadiene from the reaction mixture formed in the preceding operation.

4. The method of purifying butadiene containing a tertiary base olefin selected from the group consisting of isobutylene, trimethyl ethylene and unsymmetrical methyl ethyl ethylene as a contaminant, which comprises: forming an admixture of said contaminated butadiene and hydrogen sulfide; passing said admixture in the vapor phase through a reaction zone containing phosphoric acid, regulating the flow of said admixture through said reaction zone to provide therein a contact time from a fraction of a second to several minutes and maintaining the temperature of said admixture therein between about 25° C. and about 175° C., whereby said tertiary base olefin is converted to the corresponding tertiary mercaptan; and separating butadiene from the reaction mixture formed in the preceding operation.

5. The method of purifying butadiene containing a tertiary base olefin selected from the group consisting of isobutylene, trimethyl ethylene and unsymmetrical methyl ethyl ethylene as a contaminant, which comprises: forming an admixture of said contaminated butadiene and hydrogen sulfide; passing said admixture in the vapor phase through a reaction zone containing phosphoric acid, regulating the flow of said admixture through said reaction zone to provide therein a contact time from a fraction of a second to several minutes and maintaining the temperature of said admixture therein at about 75° C. to about 80° C., whereby said tertiary base olefin is converted to the corresponding tertiary mercaptan; and separating butadiene from the reaction mixture formed in the preceding operation.

6. The method of purifying butadiene containing a tertiary base olefin selected from the group consisting of isobutylene, trimethyl ethylene and unsymmetrical methyl ethyl ethylene as a contaminant, which comprises: forming an admixture of said contaminated butadiene and hydrogen sulfide; passing said admixture in the vapor phase through a reaction zone containing phosphoric acid, regulating the flow of said admixture through said reaction zone to provide therein a contact time from a fraction of a second to several minutes and maintaining the temperature of said admixture therein between about 25° C. and about 175° C., and maintaining in said reaction zone a pressure from about atmospheric to about 4 atmospheres, whereby said tertiary base olefin is converted to the corresponding tertiary mercaptan; and separating butadiene from the reaction mixture formed in the preceding operation.

7. The method of purifying butadiene containing a tertiary base olefin selected from the group consisting of isobutylene, trimethyl ethylene and unsymmetrical methyl ethyl ethylene as a contaminant, which comprises: forming an admixture of said contaminated butadiene and a slight excess—based on tertiary base olefin—of hydrogen sulfide; passing said admixture in the vapor phase through a reaction zone containing phosphoric acid, regulating the flow of said admixture through said reaction zone to provide therein a contact time from a fraction of a second to several minutes and maintaining the temperature of said admixture therein between about 25° C. and about 175° C., whereby said tertiary base olefin is converted to the corresponding tertiary mercaptan; and separating butadiene from the reaction mixture formed in the preceding operation.

8. The method of purifying butadiene containing a tertiary base olefin selected from the group consisting of isobutylene, trimethyl ethylene and unsymmetrical methyl ethyl ethylene as a contaminant, which comprises: forming an admixture of said contaminated butadiene and hydrogen sulfide; passing said admixture in the vapor phase through a reaction zone containing phosphoric acid adsorbed on a catalytically inert substance, regulating the flow of said admixture through said reaction zone to provide therein a contact time from a fraction of a second to several minutes and maintaining the temperature of said admixture therein between about 25° C. and about 175° C., whereby said tertiary base olefin is converted to the corresponding tertiary mercaptan; and separating butadiene from the reaction mixture formed in the preceding operation.

9. The method of purifying butadiene contaminated with isobutylene, which comprises: forming an admixture of said contaminated butadiene and hydrogen sulfide; passing said admixture in the vapor phase through a reaction zone containing phosphoric acid, regulating the flow of said admixture through said reaction zone to provide therein a contact time from a fraction of a second to several minutes and maintaining the temperature of said admixture therein between about 25° C. and about 175° C., whereby said isobutylene is converted to tertiary butyl mercaptan; and separating butadiene from the reaction mixture formed in the preceding operation.

10. The method of purifying butadiene contaminated with isobutylene, which comprises: forming an admixture of said contaminated butadiene and hydrogen sulfide; passing said admixture in the vapor phase through a reaction zone containing phosphoric acid, regulating the flow of said admixture through said reaction zone to provide therein a contact time from a fraction of a second to several minutes and maintaining the temperature of said admixture therein at about 75° C. to about 80° C., whereby said isobutylene is converted to tertiary butyl mercaptan; and separating butadiene from the reaction mixture formed in the preceding operation.

HENRY G. DALEY.
DUNCAN J. CROWLEY.
DARWIN E. BADERTSCHER.
HARRY L. COONRADT.